(12) United States Patent
Tomita

(10) Patent No.: US 6,426,817 B1
(45) Date of Patent: Jul. 30, 2002

(54) OPTICAL WAVELENGTH MULTIPLEXING SYSTEM AND TERMINAL

(75) Inventor: Takaharu Tomita, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/236,580

(22) Filed: Jan. 26, 1999

(30) Foreign Application Priority Data

Mar. 4, 1998 (JP) .......................................... 10-052293

(51) Int. Cl.$^7$ .......................... H04J 14/02; H04B 10/00
(52) U.S. Cl. ....................................... 359/127; 359/161
(58) Field of Search ................................ 359/124, 161, 359/163, 177, 187

(56) References Cited

U.S. PATENT DOCUMENTS

| | | | | |
|---|---|---|---|---|
| 5,396,360 A | * | 3/1995 | Majima | 359/133 |
| 5,907,420 A | * | 5/1999 | Chraplyvy et al. | 359/179 |
| 6,134,034 A | * | 10/2000 | Terahara | 359/124 |
| 6,268,945 B1 | * | 7/2001 | Roberts | 359/161 |
| 6,282,017 B1 | * | 8/2001 | Kinoshita | 359/341.42 |

OTHER PUBLICATIONS

U.S application No. 08/923,934, Iwata et al., filed Sep. 5, 1997.

* cited by examiner

*Primary Examiner*—Leslie Pascal
*Assistant Examiner*—Dalzid Singh
(74) *Attorney, Agent, or Firm*—Staas & Halsey LLP

(57) ABSTRACT

In an optical wavelength multiplexing system capable of multiplexing 16 wavelengths at maximum, when only a part of wavelengths are used in an initial operation in a newly established system, the operation of an optical amplifier causes the level of an optical signal per wavelength to be too high, thereby deteriorating the waveform of an optical signal by the nonlinear effect in a transmission line, etc. As a result, the transmission quality is lowered because the system is established based on 16 multiplexed wavelengths. Therefore, when only a part of the 16 waves are used as signal wavelengths, a light having a wavelength λc different from the signal wavelength is transmitted with the optical signal so that a total level of a light propagated in a transmission line can be equal to the level obtained when 16 waves are wavelength-multiplexed. Thus, the level of the optical signal having each wavelength is approximately adjusted.

10 Claims, 7 Drawing Sheets

OPTICAL WAVELENGTH MULTIPLEXING SYSTEM AND TERMINAL

BACKGROUND OF THE INVENTION

1. Field of the Invention

The present invention relates to an optical communications system using optical wavelength multiplexing technology.

2. Description of the Related Art

Recently, active research and development are made to establish a multimedia communications network which integrally accommodates various types of data for use not only in the conventional voice communications, but also in image data communications using a computer, etc. Especially, a capacity required to display one screen of image data is larger than for voice data. To realize a TV telephony, etc., a large capacity of image data must be transferred in real time. Therefore, a communications network to realize such multimedia communications requires a very high data transmission speed. Under this situation, a broadband ISDN, etc. has been studied for implementation. However, since the transmission speed is limited in the electric communications, the optical communications are being highlighted. Particularly, in the optical communications, an optical wavelength division multiplexing system can accommodate a larger volume of information, and is desired to be realized for practical use.

In response to a strong request to largely increase the volume of data to be accommodated, recently optical wavelength multiplexing systems tend to be operated with an increasing number of multiplexed wavelengths, up to 32, 64, and 128 waves. However, the maximum number of wavelengths originally designed for a communications system is not normally used from the start of its operation. The number of multiplexed wavelengths is increased depending on conditions such as an increasing number of subscribers, etc. As a result, it is necessary to design the system such that the number of applicable wavelengths can be sequentially increased on demand for a line without using all applicable wavelengths from the beginning.

When the number of wavelengths to be multiplexed is increased, the number should be sequentially increased without affecting the wavelengths already in service. This is referred to as an in-service upgrade.

In an optical wavelength multiplexing system using an optical amplifier in a transmission line, the optical amplifier is normally operated under ALC (automatic level control) or APC (automatic power control). In this case, the optical amplifier is operated such that the value of an input level can be a predetermined value regardless of an input level (represented by {output per wave (dBm)}+10 log n, where n indicates the number of input wavelengths).

The optical wavelength multiplexing system is designed in a way that the system can optimally function when all wavelengths are input. However, in the optical wavelength multiplexing system, all wavelengths are not utilized from the beginning. Normally, the number of wavelengths are sequentially increased on demand.

If the number of input wavelengths is small, the optical amplifier excessively amplifies the level of a signal light, and a too high level distorts the signal light due to a nonlinear effect, thereby deteriorating the transmission quality.

When the number of multiplexed wavelengths is 4 through 8 and a small number of upgrading operations are actually performed, a dummy light source is provided, to avoid the above described problem, even for a wavelength not in service to transmit a light having the number of wavelengths necessary for the optimum operation in the conventional technology.

FIG. 1 shows the conventional method.

In FIG. 1, the optical wavelength multiplexing system is designed to set the maximum number of multiplexed wavelengths to 4. When the system is established, only a 2-wave optical signal is used in a line actually in service as shown in FIG. 2. In FIG. 2, the wavelengths λ of 1 and 2 are used. In this case, since the system is designed such that it can optimally function when the number of multiplexed wavelengths are four, the transmission quality is deteriorated by the operation of the optical amplifier as described above if only two waves are used. Therefore, dummy lights are transmitted as the wavelengths 3 and 4 to maintain the transmission quality of the system. Normally, the dummy lights contain no information, so are transmitted to enable an optical sender to maintain the transmission quality.

However, in the above described method, it is necessary to first provide a relatively expensive optical sender (OS), thereby causing a problem of costly initial investment. Furthermore, the larger the number of multiplexed wavelengths, the larger the number of optical senders required to maintain the transmission quality, thereby further causing demerit to the method.

As described above, when the system is operated with the number of multiplexed wavelengths smaller than the number of multiplexed wavelengths with which the system optimally functions in the optical wavelength multiplexing system, the transmission quality is deteriorated if no action is taken, thereby failing to provide satisfactory services.

Furthermore, when the number of dummy lights is equal to the number of unused wavelengths as in the conventional technology, the initial investment can be reduced with a smaller number of optical senders for transmitting dummy lights if the maximum number of multiplexed wavelengths is small. However, the number of optical senders for transmitting dummy lights becomes large if a system having a large maximum number of multiplexed wavelengths is designed on demand, thereby causing a problem of very large initial investment.

SUMMARY OF THE INVENTION

An object of the present invention is to provide a device for preventing the transmission quality of the optical wavelength multiplexing system from being deteriorated with the initial investment suppressed even if the number of multiplexed wavelengths is small.

The optical wavelength multiplexing system according to the present invention includes an optical signal transmission unit, corresponding to at least one wavelength, for transmitting an optical signal containing information to be transmitted; and a control light transmission unit for multiplexing with the light signal a light having a wavelength different from the wavelength of the optical signal containing the information, transmitting the multiplexing result, and adjusting the optical level of a total of the actually transmitted optical signal and the light such that it is substantially equal to the total optical level of a signal transmitted when an optical signal having the maximum number of multiplexed wavelengths which can be accommodated in the optical wavelength multiplexing system is transmitted.

In an optical wavelength multiplexing system, the terminal station according to the present invention includes an optical signal transmission unit, corresponding to at least one wavelength, for transmitting an optical signal containing information to be transmitted; and a control light transmission unit for multiplexing with the light signal a light having a wavelength different from the wavelength of the optical signal containing the information, transmitting the multiplexing result, and adjusting the optical level of a total of the actually transmitted optical signal and the light such that it is substantially equal to the total optical level of a signal transmitted when an optical signal having the maximum number of multiplexed wavelengths which can be accommodated in the optical wavelength multiplexing system is transmitted.

According to the present invention, it is not necessary to stop an optical signal of a line currently in use when the number of multiplexed wavelengths is increased. The number of multiplexed wavelengths can be increased only by newly multiplexing an optical signal having a new wavelength, and reducing the level of a light transmitted from a control light transmission unit. Therefore, the in-service upgrade can be realized furthermore easily.

Additionally, unlike the conventional technology, the initial investment can be considerably reduced because it is not necessary to include a number of optical senders in the initial configuration.

DESCRIPTION OF THE PREFERRED EMBODIMENTS

Figure 1:
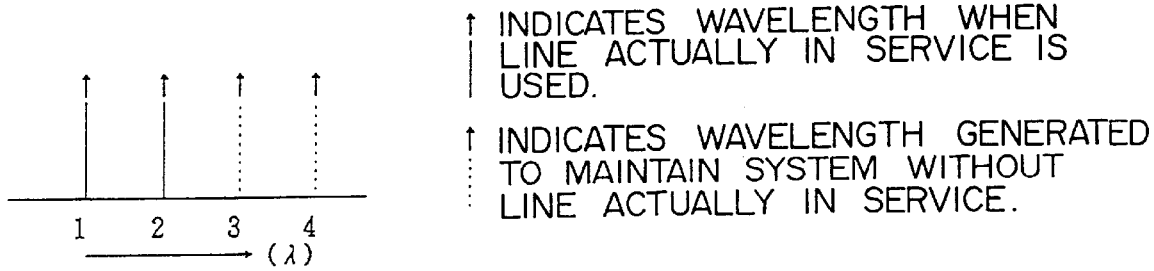
FIG. 1 shows the conventional method.
Figure 2:
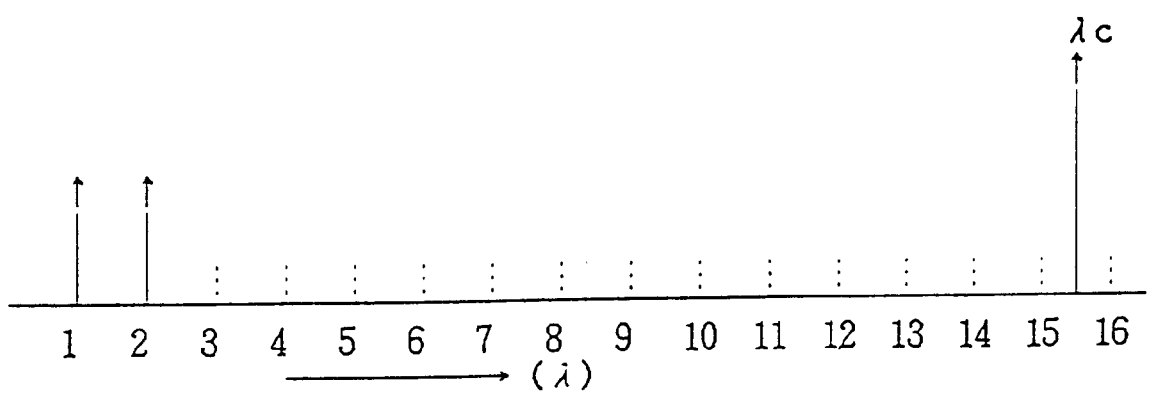
FIG. 2 shows the principle of the present invention.

FIG. 2 shows the principle of the present invention.

According to the present invention, a light having a wavelength different from the wavelength of a signal light is transmitted to adjust the entire system as shown in FIG. 2. As a result, the total level of the optical signal being propagated through the system can be maintained by adjusting the optical level.

Since the level of the entire system is maintained using a light having a level control wavelength $\lambda c$ assigned separately from a signal wavelength, the total level of an optical signal propagated through the system can be maintained by adjusting (lowering) the level of the light having the control wavelength $\lambda c$ each time the wavelength is upgraded.

As shown in FIG. 2, the level control wavelength $\lambda c$ is set at the position of a wavelength different from the wavelength for use in a line, that is, in this example, between $\lambda 15$ and $\lambda 16$ or close to the gain central wavelength of an optical amplifier.

In the case shown in FIG. 2, only two wavelengths are used in the system in which the maximum of 16 waves can be wavelength-multiplexed. The level of the dummy light having the wavelength $\lambda c$ is set such that the entire level of the wavelengths 1, 2, and $\lambda c$ is equal to the level obtained when the 16-wave optical signal is wavelength-multiplexed as shown in the example described later.

When the number of wavelengths used in a line actually in service is small, the level of the wavelength $\lambda c$ is extremely high and may cause a nonlinear effect. However, there is no problem of wavelength deterioration due to the nonlinear effect because the light having the wavelength $\lambda c$ is not modulated at all, or carries no information. Therefore, the level of the light having the wavelength $\lambda c$ can be set relatively freely. However, since the effect of four photon mixing, etc. may have an influence on the optical signal in the line actually in service, it is necessary to set the wavelength $\lambda c$ and its level in such a way that the influence can be suppressed.

In the case shown in FIG. 2, the wavelength $\lambda c$ is set between the wavelengths 15 and 16. It also can be set to a wavelength close to the gain central wavelength of the optical amplifier as described above. Since the wavelength of the line actually in service is set at the gain band of the optical amplifier, the wavelengths 1 through 16 are set such that they can be within the gain band of the optical amplifier in FIG. 2. Therefore, the gain central wavelength of the optical amplifier is set around the wavelength 8. Therefore, the wavelength $\lambda c$ is set between the wavelengths 7 and 8, between the wavelengths 8 and 9, etc. Thus, the relative deterioration of the level caused by connecting a plurality of optical amplifiers can be avoided by setting the wavelength $\lambda c$ close to the gain central wavelength. Therefore, the entire level of the optical signal, of the light having the wavelength $\lambda c$, propagated through the transmission line can be maintained in the network.

Furthermore, the in-service upgrade can be easily performed by adding an optical signal having a new wavelength without stopping the optical signal having the wavelength being used, and simultaneously adjusting the level of the light having the wavelength $\lambda c$.

In the descriptions above, the wavelength of the control light is only $\lambda c$. However, if a sufficient effect cannot be obtained by only one wavelength, a plurality of wavelengths of a control light are provided to adjust the total level of the light propagated through a transmission line.

Figure 3:
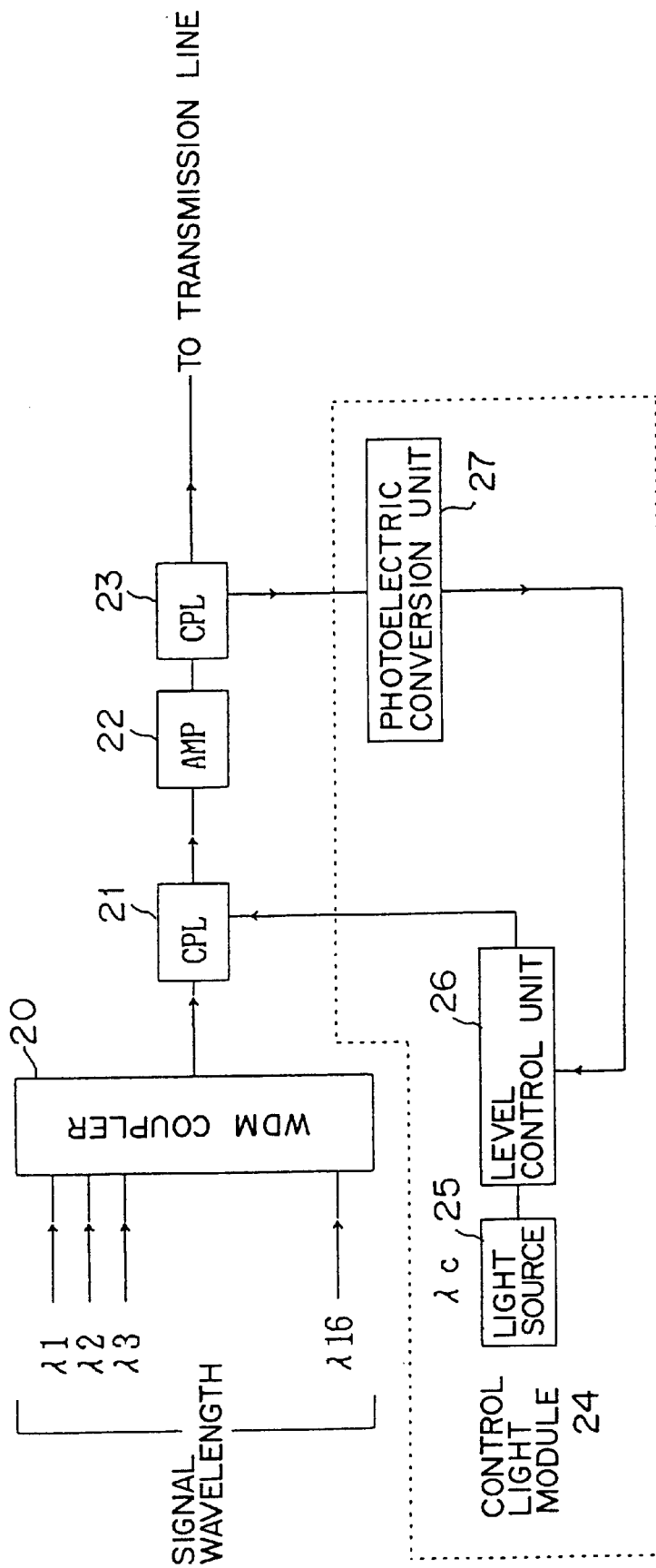
FIG. 3 is a block diagram showing the configuration for realization of the principle of the present invention.

FIG. 3 is a block diagram showing the configuration for realization of the principle of the present invention.

FIG. 3 shows the configuration of an optical transmission terminal station. A unit for generating a dummy light having the wavelength $\lambda c$ or a control light is designed as a control light module 24 which can be removable as necessary.

In FIG. 3, the maximum number of multiplexed wavelengths is 16. The system can be designed for a larger number of multiplexed wavelengths. This system is described below by referring to FIG. 3.

When all of the wavelengths $\lambda 1$ through $\lambda 16$ are used as lines actually in service, a control light is not required. Therefore, the control light module 24 is removed. An optical signal having wavelengths $\lambda 1$ through $\lambda 16$ is input to a WDM coupler 20 and wavelength-multiplexed, and then output as a wavelength-multiplexed optical signal. The wavelength-multiplexed optical signal passes through a coupler 21, is amplified by an optical amplifier 22, passes through another coupler 23, and is then output to the transmission line.

If only a part of the wavelengths $\lambda 1$ through $\lambda 16$ of a signal is used, the control light module 24 is provided to set the total level of the optical signal transmitted to the transmission line is set to a predetermined value. The control light module 24 is provided with a light source 25 for outputting a light having a predetermined wavelength λc. The light output from the light source 25 is level-controlled by a level control unit 26, and is then transmitted to the coupler 21. The level control unit 26 is, for example, an optical variable attenuator or an optical amplifier.

The control light level-controlled by the level control unit 26 is coupled by the coupler 21 to a wavelength-multiplexed signal from the WDM coupler 20. Then, it is amplified by the optical amplifier 22 and input to the coupler 23. The coupler 23 branches a part of all input optical signals. The branched optical signal is converted by a photoelectric conversion unit 27 into an electric signal corresponding to the levels of all optical signals. The electric signal is input to the level control unit 26, converted into a level adjustment signal for a control light, and used for level adjustment of a control light.

Thus, the total level of the optical signal transmitted to the transmission line is fed back from the coupler 23 to the level control unit 26, and controlled such that the control light can be set to the optimum level. The totally level-controlled optical signal is transmitted from the coupler 23 to the transmission line. Thus, the total level of the optical signal to be transmitted to the transmission line is automatically controlled into an optimum state and transmitted to the transmission line without deteriorating the transmission quality of the system during the operation of the system. When the upgrade is performed, the control light module 24 automatically adjusts the entire optical level only by inputting an optical signal having a new wavelength to the WDM coupler 20, thereby easily performing the in-service upgrade.

Furthermore, since the control light module 24 is designed to be removable, the control light module 24 can be removed when 16 waves are used as signal wavelengths. Therefore, the control light module 24 can be applied to a system which is another optical wavelength multiplexing system, and is not using the maximum number of wavelengths to be multiplexed.

Figure 4:
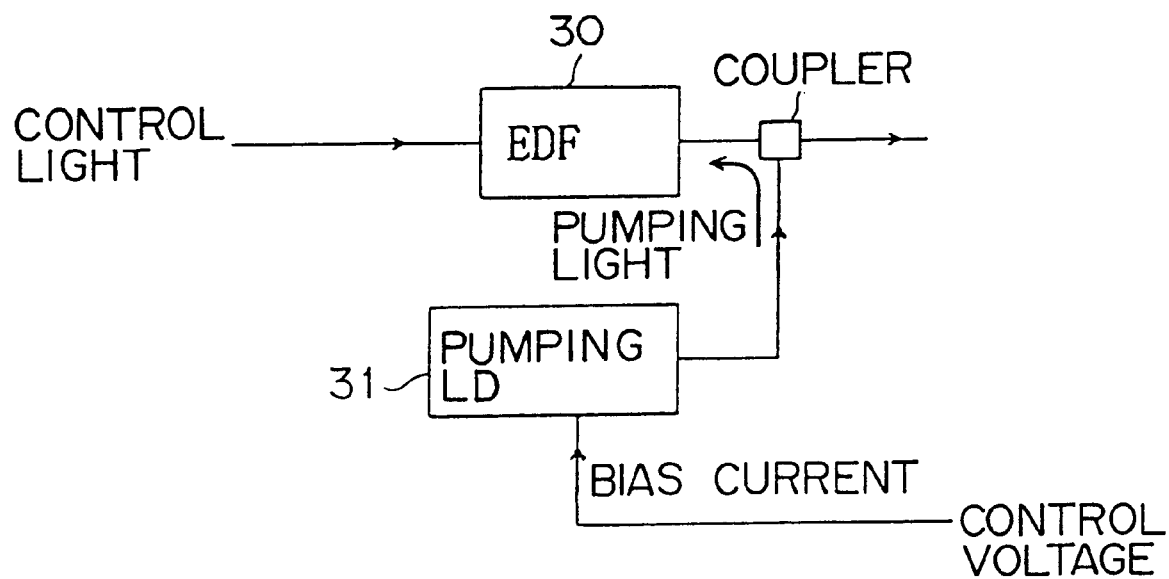
FIG. 4 shows an example of the configuration of the level control unit shown in FIG. 3.

FIG. 4 shows an example of the configuration of the level control unit shown in FIG. 3.

With the configuration shown in FIG. 3, the level control unit comprises an optical amplifier. A control light from the light source 25 shown in FIG. 3 is input to an EDF (erbium doped fiber) 30. Furthermore, a control voltage is applied as a bias current of a pumping laser (LD) 31 from the photo-electric conversion unit 27 shown in FIG. 3. The pumping laser 31 outputs an excitation light depending on the power of the bias current. The excitation light is input to the EDF 30 through a coupler 32. In the case shown in FIG. 4, the exciting method of the EDF 30 refers to forward excitation, but backward excitation can also be performed.

The EDF 30 amplifies and outputs a control light depending on the power of the pumping light. Since the amplification ratio changes with the power of an excitation light, the amplification ratio of the EDF 30 can be controlled by controlling using the bias current the output level of the excitation light of the pumping laser 31. Thus, the control light is amplified up to a desired level and output to be coupled to an optical signal from the WDM coupler 20.

In FIG. 4, the level of a control light is adjusted by controlling the gain of an optical amplifier, but an optical variable attenuator can be used to adjust the level. That is, a control light is amplified by an optical amplifier having a constant gain up to the highest expected level. Then, the level of the control light amplified by the optical variable attenuator is adjusted. Recently, an optical variable attenuator whose attenuation ratio can be controlled by applying a control voltage is well known. Such an optical variable can be used to control the level of a control light using an electric signal as shown in FIG. 4.

Figure 5:
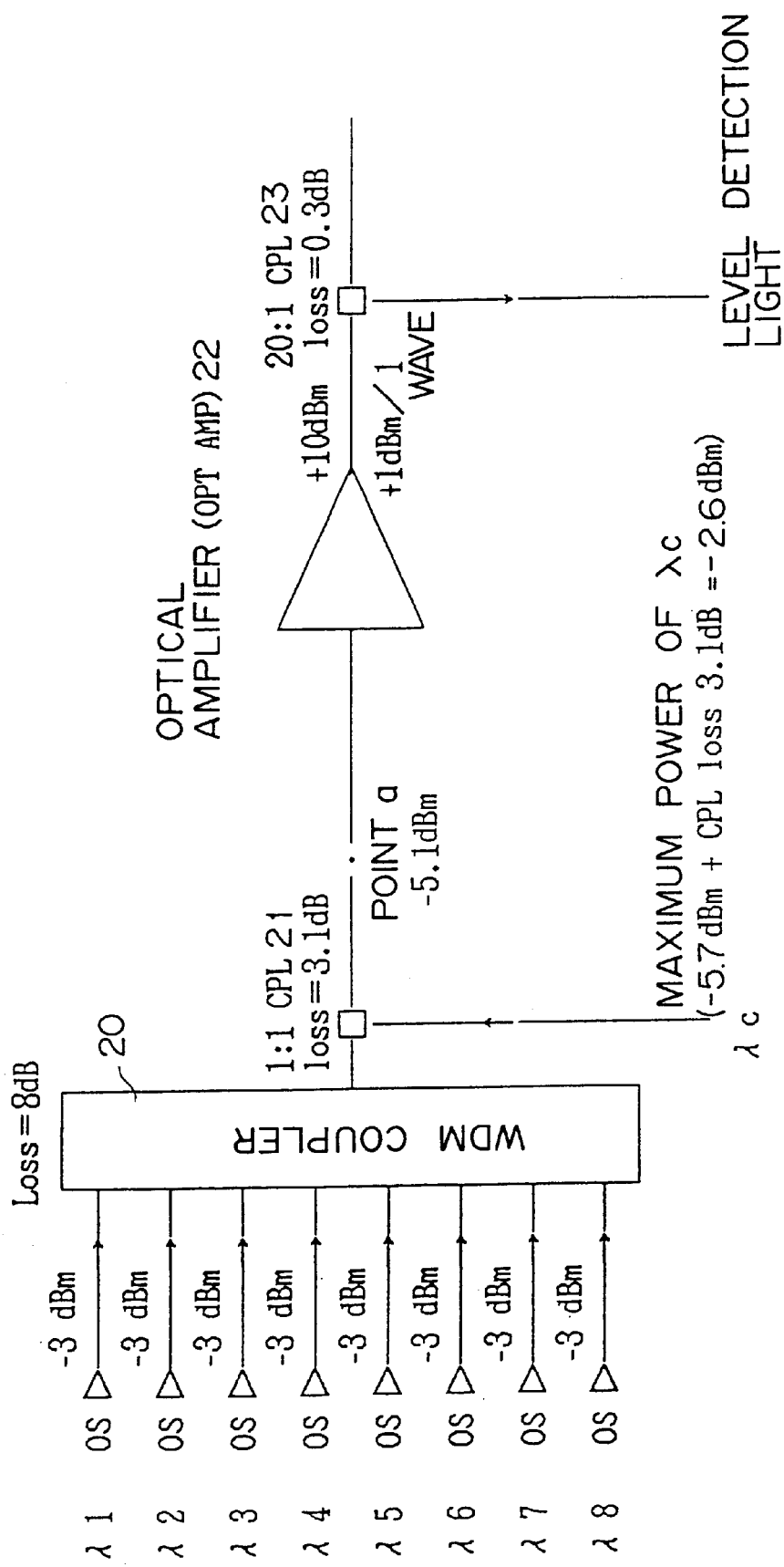
FIG. 5 shows a practical example of the state of the level control by a control light.

FIG. 5 shows a practical example of the state of the level control using a control light.

In FIG. 5, the components also shown in FIG. 2 are assigned the same reference numbers.

Assume that at maximum 8 waves λ1 through λ8 are used in a line actually in service, and the power of the optical signals having respective wavelengths is −3 dBm. When these optical signals are transmitted from an optical sender (OS), the entire power can be −3 dBm+10 log 8≈6 dBm by multiplexing 8 waves. Furthermore, when the loss by the WDM coupler 20 is 8 dB, and the loss by the coupler 21 is 3.1 dB, the power at point a can be obtained by the equation 6 dBm+(−8 dB)+(−3.1 dB)=−5.1 dBm. Assuming that the optical amplifier 22 amplifies the light up to +10 dBm, the level per wave can be obtained by the equation 10 log (10/8)≈1 dBm.

The level of the optical signal at point a when the light having the wavelength passing through a line actually in service is sequentially increased from 1 wave to 8 waves is obtained as follows.

when the number of waves is 1: −3 dBm+10 log 1−8 db−3.1 dB=−14.1 dBm;

when the number of waves is 2: −3 dBm+10 log 2−8 db−3.1 dB=−11.1 dBm;

when the number of waves is 4: −3 dBm+10 log 4−8 db−3.1 dB=−8.1 dBm;

when the number of waves is 6: −3 dBm+10 log 6−8 db−3.1 dB=−6.3 dBm; and when the number of waves is 8: −3 dBm+10 log 8−8 db−3.1 dB=−5.1 dBm.

As described above, the level at point a changes with an increasing number of wavelengths. If the level is collectively amplified by an optical amplifier, and the number of multiplexed wavelengths is small due to the amplification up to +10 dBm, then the level per wave becomes too high. Therefore, the total optical level at point a should be set to −5.1 dBm to maintain the level per wave at approximately 1 dBm. To attain this, a control light having the wavelength λc is used.

The necessary level of a control light is obtained by the following equations.

$$-5.1 \text{ dBm} = 10 \log (\{\text{Watts of optical signal in line actually in service at point } a\} + \{\text{Watts of control light having wavelength } \lambda c\})$$

Watts at point a when the number of waves is 1: −14.1 dBm≈10 log(0.04 mW);

when the number of waves is 2: −11.1 dBm≈10 log(0.08 mW);

when the number of waves is 4: −8.1 dBm≈10 log(0.15 mW);

when the number of waves is 6: −6.3 dBm≈10 log(0.23 mW); and when the number of waves is 8: −5.1 dBm≈10 log(0.309 mW).

From the equations above, the level of the control light at point a can be obtained by the following equations.

When the number of waves is 1: 10 log(0.27)≈−5.7 dBm;

When the number of waves is 2: 10 log(0.23)≈−6.4dBm;

When the number of waves is 4: 10 log(0.16)≈−8.0 dBm;
When the number of waves is 6: 10 log(0.08)≈−11.0dBm; and
When the number of waves is 8: 10 log(0)=−∞ dBm.
When the number of waves is 8, no control lights are required.

Therefore, the maximum level of the control light at point a is −5.7 dBm. However, with the loss by the coupler 21 taken into account, −5.7 dBm+3.1 dB=2.6 dBm level is required for output from the level control unit.

The coupler 23 shown in FIG. 5 branches the optical signal amplified up to +10 dBm by the optical amplifier 22 into a light to be transmitted to a transmission line and a level detection light in the ratio of 20:1.

Figure 6:
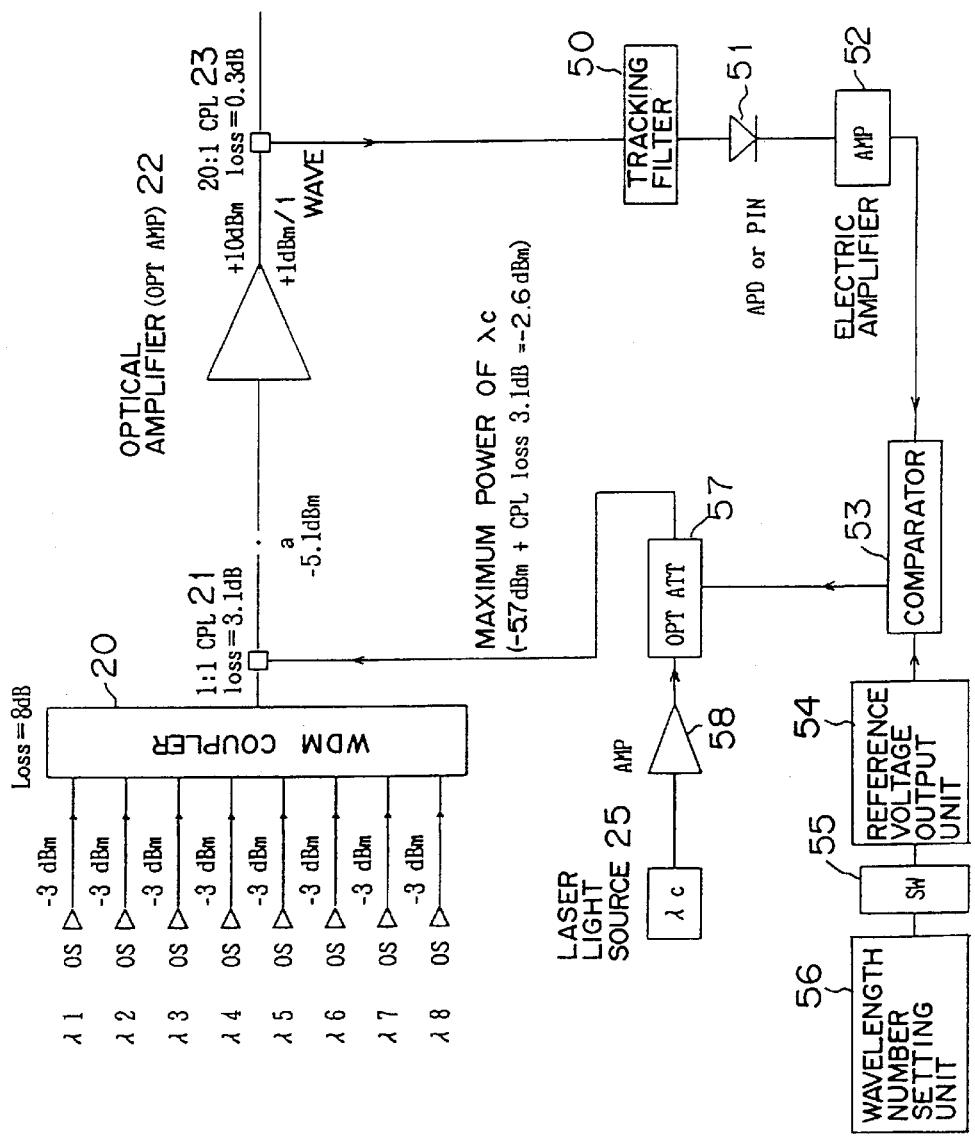
FIG. 6 shows a practical example of the configuration for level control by a control light.

FIG. 6 shows an example of a practical configuration for level control of a control light.

As in FIG. 4, a component also shown in FIG. 2 is assigned the same reference number.

In FIG. 6, an optical amplifier 58 and an optical variable attenuator 57 are used to follow the level control method for a control light. A desired number of optical signals having a desired wavelength are output from the optical sender (OS) for each wavelength (λ1 through λ8), and input to the WDM coupler 20. An optical signal output from the WDM coupler 20 is coupled to a control light by the coupler 21, and transmitted to the optical amplifier 22. The optical amplifier 22 amplifies the level of the entire optical signal up to +10 dBm, and maintains the level of an optical signal having each wavelength at approximately 1 dBm. This optical signal is input to the coupler 23, a part of them are branched, and the most part of them are transmitted to the transmission line.

The optical signal branched by the coupler 23 passes through a tracking filter 50, and one of the multiplexed optical signals in a line actually in service is extracted. Otherwise, a control signal having the wavelength λc can be extracted. When a light having the wavelength λc is extracted, it is converted into electricity by a photoelectric conversion unit 51 (PIN, or APD; photodiode), and then amplified by a electric amplifier 52. A comparator 53 determines whether or not the control light is maintained at a level corresponding to the number of wavelengths. The number of wavelengths in a line actually in service is set in a wavelength number setting unit 56, and a signal for switching a reference voltage is output from the wavelength number setting unit 56 to a switch 55. The switch 55 outputs a reference voltage corresponding to the number of wavelengths in a line in service to a reference voltage output unit 54. The level of a control light for each number of wavelengths is described by referring to FIG. 5.

A comparison result from the comparator 53 is applied to the optical variable attenuator 57 as a bias voltage, output from the laser light source 25, and used to set the control light amplified by the optical amplifier 58 at a predetermined level.

When one of the optical signals in a line actually in service is extracted, the reference voltage output unit 54 outputs the reference voltage indicating the level per wave to be maintained for an optical signal regardless of the number of wavelengths being used. The comparator 53 compares the reference voltage with the voltage value indicating the level of the current optical signal generated by the photoelectric conversion unit 51 and the electric amplifier 52. The comparison result is input as a control signal to the optical variable attenuator 57. In this case, the wavelength number setting unit 56 and the switch 55 are not required. However, it is necessary to keep a sufficient wavelength interval between the signal wavelength and the wavelength λc.

Figure 7:
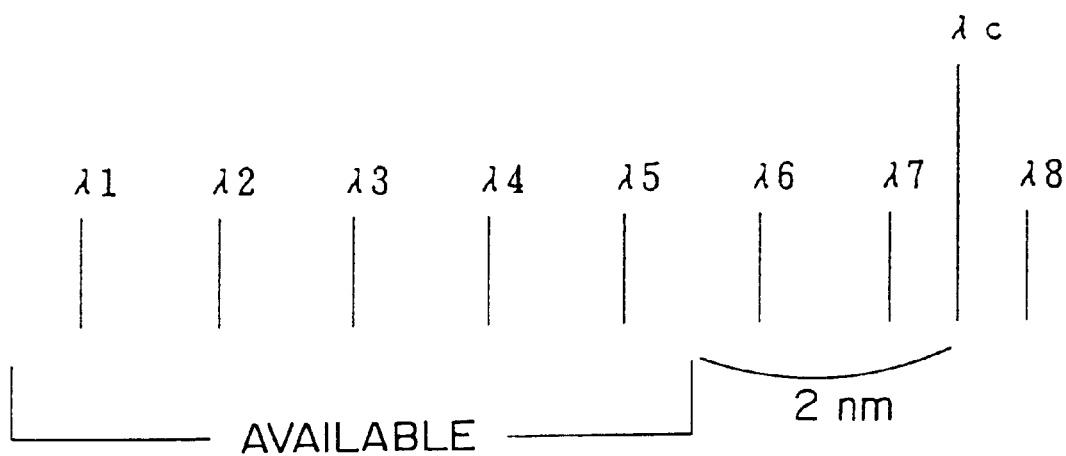
FIG. 7 shows the case where an optical signal having a signal wavelength is used for level control.

FIG. 7 shows the case where an optical signal having a signal wavelength is used for level control.

As shown in FIG. 7, when an optical signal having a signal wavelength is used for level control, it is necessary to use an optical signal having a signal wavelength sufficiently apart from the wavelength λc of the control signal. The space between the signal wavelength and the wavelength λc depends on the performance of a tracking filter. Normally, the space should be approximately 2 nm. For example, if the signal wavelengths of λ1 through λ8 are arranged at intervals of 0.8 nm, and the wavelength λc is between the wavelengths λ7 and λ8, then the optical signal having the signal wavelengths λ1 through λ5 can be applicable for level control.

In the level control of a control light used to maintain good transmission quality of an optical signal in a line actually in service, parameters to be considered are an output level of an optical amplifier, the number of multiplexed wavelengths, the intervals between wavelengths, etc. Too strong a control light affects a signal light in a line actually in service. The output level of an optical amplifier can be substantially +11 dBm. When the number of multiplexed wavelengths increases, the output level of an amplifier becomes higher. Therefore, the output level of the optical amplifier is set to a value within an appropriate range. Furthermore, since optical signals of respective wavelengths have influences on each other when the wavelengths are arranged at short intervals, sufficient space should be maintained between them. In addition, it should be taken into account that these parameters affect each other through cross phase modulation.

According to the present invention, a system can be upgraded without lowering the transmission quality of a line. That is, an in-service upgrade can be successfully realized.

Furthermore, no optical senders (OS) are required when a system is established, thereby considerably reducing the initial investment.

What is claimed is:

1. An optical wavelength multiplexing system, comprising:

an optical signal transmission unit, corresponding to at least one wave length, the optical signal transmission unit transmitting an optical signal including information to be transmitted;

a wavelength number setting unit storing a number of wavelengths in service; and a control light transmission unit multiplexing with the optical signal a light having a wavelength different from that of the optical signal including the information to be transmitted, transmitting the multiplexed light and signal, and a total optical level of the actually transmitted optical signal and multiplexed light is adjusted to be equal to a total optical level of the optical signal transmitted when an optical signal is transmitted having a maximum number of multiplexed wavelengths of said optical wavelength multiplexing system, and is adjusted according to the number or wavelengths in service, which is stored in the wavelength number setting unit to indicate an appropriate optical level of the optical light having the different wavelength from that of the optical signal including the information.

2. The system according to claim 1, wherein an optical level of the light transmitted by said control light transmission unit is reduced with a sequentially increasing number of wavelengths of the optical signal to be actually transmitted.

3. The system according to claim 1, wherein said control light transmission unit is provided as a module removable from and attachable to said optical wavelength multiplexing system.

4. The system according to claim 1, wherein:

said control light transmission unit comprises a light source, and an optical variable attenuator adjusting an optical level of a light from the light source, detects a total optical level of the optical signal actually transmitted from said optical signal transmission unit and the light transmitted from said light control unit, controls the optical variable attenuator based on a detection result, and adjusts the optical level of the light from the light source.

5. The system according to claim 1, wherein:

said control light transmission unit comprises a light source, and an optical amplifier amplifying a light from the light source, detects a total optical level of the optical signal actually transmitted from said optical signal transmission unit and the light transmitted from said light control unit, controls an amplification ratio of the optical amplifier based on a detection result, and adjusts the optical level of the light from the light source.

6. A terminal station in an optical wavelength multiplexing system, comprising:

an optical signal transmission unit, corresponding to at least one wavelength, transmitting an optical signal including information to be transmitted;

a wavelength number setting unit storing a number of wavelengths in service; and a control light transmission unit multiplexing with the optical signal a light having a wavelength different from that of the optical signal including the information to be transmitted, transmitting the multiplexed light and signal, and a total optical level of the actually transmitted optical signal and multiplexed light is adjusted to be equal to a total optical level of the optical signal transmitted when an optical signal is transmitted having a maximum number of multiplexed wavelengths of said optical wavelength multiplexing system, and is adjusted according to the number of wavelengths in service, which is stored in the wavelength number setting unit to indicate an appropriate optical level of the optical light having the different wavelength from that of the optical signal including information.

7. The terminal station according to claim 6, wherein an optical level of the light transmitted by said control light transmission unit is reduced with a sequentially increasing number of wavelengths of the optical signal to be actually transmitted.

8. The terminal station according to claim 6, wherein said control light transmission unit is provided as a module removable from and attachable to said optical wavelength multiplexing system.

9. The terminal station according to claim 6, wherein:

said control light transmission unit comprises a light source, and an optical variable attenuator adjusting an optical level of a light from the light source, detects a total optical level of the optical signal actually transmitted from said optical signal transmission unit and the light transmitted from said light control unit, controls the optical variable attenuator based on a detection result, and adjusts the optical level of the light from the light source.

10. The terminal station according to claim 6, wherein:

said control light transmission unit comprises a light source, and an optical amplifier amplifying a light from the light source, detects a total optical level of the optical signal actually transmitted from said optical signal transmission unit and the light transmitted from said light control unit, controls an amplification ratio of the optical amplifier based on a detection result, and adjusts the optical level of the light from the light source.

* * * * *